Dec. 13, 1927.
F. A. BYLES
1,652,928
ELECTRIC REGULATOR
Filed Oct. 17, 1924
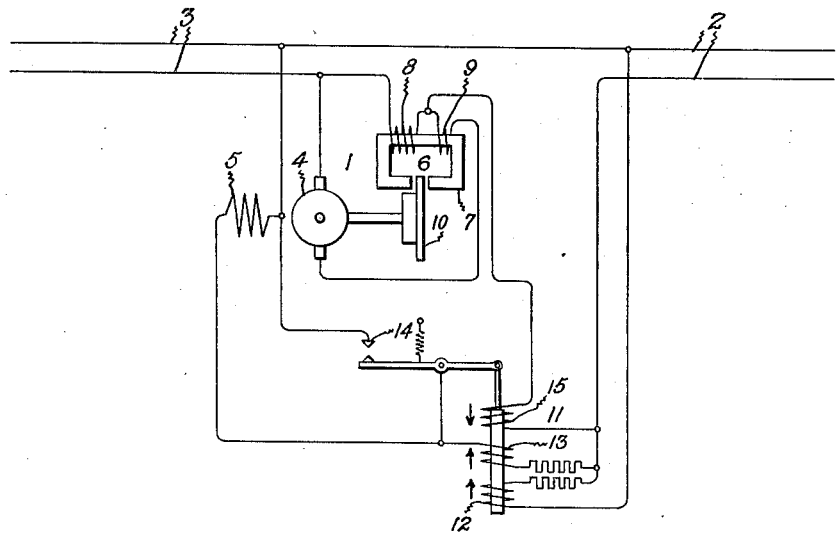
Inventor:
Frank A. Byles,
by Alexander S. Lentz
His Attorney.

Patented Dec. 13, 1927.

1,652,928

UNITED STATES PATENT OFFICE.

FRANK A. BYLES, OF SCHENECTADY, NEW YORK, ASSIGNOR TO GENERAL ELECTRIC COMPANY, A CORPORATION OF NEW YORK.

ELECTRIC REGULATOR.

Application filed October 17, 1924. Serial No. 744,279.

My invention relates to electric regulators and particularly to vibratory regulators having a vibratory device which operates in response to changes in the condition being regulated to control the regulating means, and anti-hunting means for controlling the operation of the vibratory device.

An object of my invention is to provide improved means for avoiding any undesirable undercompounding of a vibratory regulator which may be affected by the anti-hunting means thereof.

My invention will be better understood from the following description taken in connection with the accompanying diagrammatic drawing and its scope will be pointed out in the appended claims.

In the accompanying drawing, I have shown my invention in connection with a counter electromotive force regulator 1 which is arranged to control the voltage impressed upon the load circuit 2 by the supply circuit 3. The regulator 1 is of the type shown and claimed in Thompson Patent No. 1,365,566 granted January 11, 1921, and assigned to the same assignee as this application. The regulator 1, as shown, comprises a motor, the armature of which is connected in series with one side of the circuits 2 and 3 so that by varying the counter electromotive force of the motor the voltage across the circuit 2 may be varied with respect to the voltage across the supply circuit 3. 5 represents a field winding for the motor which is connected across the circuit 2.

In order to prevent excessive variations in the speed of the motor 4 during the operation thereof, a suitable brake 6 is provided therefor. As shown, the brake is of the magnetic drag type comprising a magnetic core 7, around which are wound the coils 8 and 9 and between the poles of which is the disk 10 of conducting material connected to the armature of the motor so as to rotate therewith. The coil 8 is connected across the armature of the motor and the coil 9 is connected in series therewith so that the braking effect of the brake varies with the current through the motor and the counter electromotive force of the motor.

The voltage across the circuit 2 is controlled by means of a vibrating relay 11 having a voltage coil 12 connected across the circuit 2, the voltage of which it is desired to maintain constant. The relay 11 is arranged to control the counter electromotive force of the motor 4 by having its contacts 14 short circuit the field winding 5 when the voltage across the circuit 2 decreases below a predetermined value. 13 represents an anti-hunting coil on the relay 11. This coil is connected in series with the field winding 5 but is not short circuited by the contact 14 of the voltage relay. The coil 13 is wound accumulatively with respect to the coil 12 so when the contacts 14 are closed and the excitation of the winding 13 is thereby increased, the resulting energization of the relay 11 is increased and the relay immediately opens its contacts 14.

As the load on the circuit 2 increases, it will be evident that it is necessary for the contacts 14 to remain in engagement more of the time in order to maintain the desired voltage across the circuit. Consequently, the energization of the coil 13 increases so that the relay 11 operates in response to a lower voltage across the load circuit 2. Therefore, with only the two coils 12 and 13, the regulator would tend to under-compound. In order to overcome this under-compounding effect, I provide the relay 11 with a third coil 15 which is connected so as to be energized in accordance with the load. As shown, this winding is connected in series with one side of the two circuits 2 and 3. This coil 15 is wound differentially with respect to the coils 12 and 13 and so designed that as the load increases, the increased current through the winding 15 compensates the increased current through the coil 13.

With the arrangement shown, it will be evident that as the load on the load circuit 2 increases, the regulator operates to decrease the excitation of the motor 4 so that the counter electromotive force thereof is decreased. Consequently, the energization of the anti-hunting winding 13 is increased, but this increased energization is compensated by the increased energization of compensating winding 15 due to the increased load current. Similarly, when the load decreases, both of the windings 13 and 15 are deenergized so that the compounding effect of the anti-hunting winding 13 is compensated. Therefore, it is evident that by means of the compensating winding 15, I have provided a simple and efficient means for overcoming the under-compounding effect of the anti-hunting winding 13 as the load increases.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:

1. In a regulating system for controlling a predetermined electrical characteristic of an electric circuit wherein the desired regulation is effected by varying the excitation of a dynamo electric machine; a vibratory device for controlling the excitation of the regulating dynamo electric machine comprising a winding responsive to the condition being regulated, an anti-hunting winding connected and arranged so that the energization thereof varies with the operation of said vibratory device, and a compensating winding responsive to the load connected to said electric circuit for modifying the operation of said vibratory device to compensate the compounding tendency of said anti-hunting winding.

2. In a voltage regulator for an electric circuit, a vibratory relay having a winding responsive to the voltage of said circuit, an anti-hunting winding controlled by the operation of said vibratory relay, and a compensating winding responsive to the current in said electric circuit for modifying the operation of said relay to compensate the compounding tendency of said anti-hunting winding.

3. In a voltage regulating system for an electric circuit, a dynamo electric machine connected and arranged so that variations in the excitation thereof changes the voltage of the electric circuit, and a vibratory device for controlling the excitation of said machine having a winding responsive to the voltage of said circuit, an anti-hunting winding connected and arranged so that the energization thereof varies with the operation of said vibratory device, a compensating winding responsive to the current in said circuit and arranged differentially with respect to said anti-hunting winding to compensate the compounding tendency of said anti-hunting winding.

4. In combination, a supply circuit, a load circuit connected thereto, a counter electromotive force machine having its armature connected in series with said circuits, a field winding for said machine, a circuit for said field winding, and a vibrating relay for controlling the circuit of said field winding having a voltage winding connected across said load circuit, a anti-hunting winding connected in the circuit of said field winding and arranged to operate accumulatively with respect to said voltage winding and a compensating winding connected in series with said circuits and arranged to operate differentially with respect to said anti-hunting winding.

5. In combination, a supply circuit, a load circuit connected thereto, a counter electromotive force machine having its armature connected in series with said circuits, and a vibratory device for controlling the excitation of said machine comprising a winding responsive to a voltage of said load circuit, an anti-hunting winding controlled by the operation of said vibratory device, and a compensating winding responsive to an electrical characteristic of the electrical energy supplied from said supply circuit to said load circuit.

In witness whereof, I have hereunto set my hand this 16th day of October, 1924.

FRANK A. BYLES.